May 17, 1927.  
J. KYLE  
1,629,395
VERMIN DESTROYING HEN ROOST
Filed Oct. 16, 1926
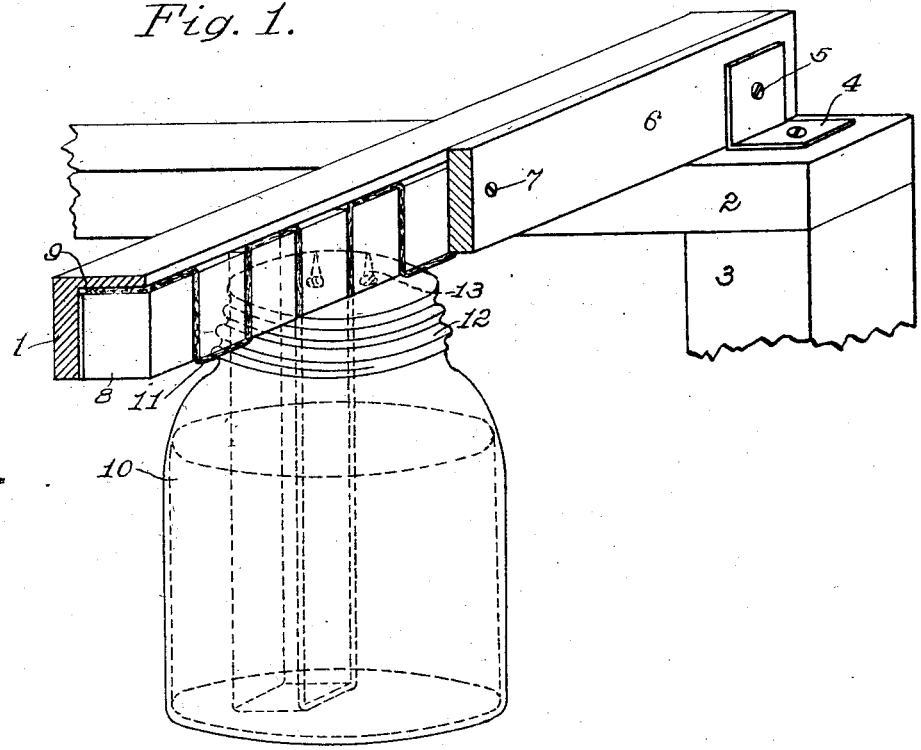
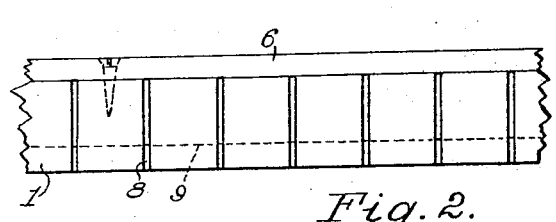
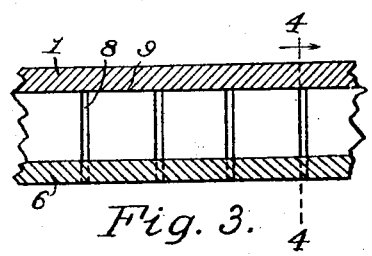
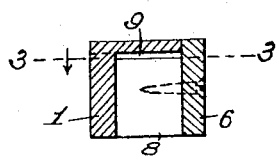
Inventor  
Joseph Kyle
By *G. C. Kennedy*  
Attorney Patented May 17, 1927.

1,629,395

UNITED STATES PATENT OFFICE.

JOSEPH KYLE, OF GREENE, IOWA.

VERMIN-DESTROYING HENROOST.

Application filed October 16, 1926. Serial No. 141,922.

My invention relates to improvements in vermin destroying roosts for poultry, and the object of my improvement is to furnish a device for this type which is of superior efficiency for the purpose for which it is designed in being constructed in a novel manner and so supplied with liquid vermicide as to remain constantly effective in driving off insects or destroying them when coming into contact with the vermicide.

This object I have accomplished by the means which are hereinafter described and claimed, and which are illustrated by the annexed drawings, it being understood that modifications of the device are covered by my invention.

In said drawings, Fig. 1 is a perspective view of a portion of my improved poultry roost as supported for use, and showing associated with the roost bar the means adopted by me for conveying a vermicidal liquid into the substance of and along said bar. Fig. 2 is a bottom plan of a part of said roost bar. Fig. 3 is a view of a part of said bar, taken partly in top plan of the inner kerf divided blocks, and partly in horizontal section on the broken line 3—3 of Fig. 4. Fig. 4 is a cross section of said roost bar taken on the broken line 4—4 of said Fig. 3.

The roost bar 1 has its ends supported upon the upper face of a cross-bar 2, the latter supported at its ends upon a post support 3, and the bar 1 secured upon the bar 2 to which it is fastened by means of angle plates 4 and screws 5.

The roost bar 1 has a longitudinal horizontal kerf 9 therein opening laterally. The bar 1 also has numerous evenly spaced transverse kerfs 8 opening downwardly and which along a part thereof at the top open into the kerf 9. This arrangement of kerfs in the bar 1, which is shown in detail in Figs. 2 to 4 inclusive, provides what resembles a continuous narrow passage 8—9 through the bar from end to end thereof with a series of rectangular return bends or looped cavities to receive a flat strip of porous textile material 11, such as a lamp wick suitable to convey a vermicidal liquid like kerosene into the interior of the wooden bar there to soak through the substance completely and quickly due to the numerous openings made in producing many interior cavities narrowly separated from each other. The downwardly opening transverse kerfs 8 separate most of the bar below a thin projecting part above the kerf 9, into small blocks united to the bar only at one side. The looped passage around each block in each instance opens downwardly so that the wick strip 11 may be inserted flatly from the side into which both kerfs 8 and 9 open. This leaves a number of parts of the strip exposed around the bottoms of alternate blocks.

At a suitable place along the bottom of the bar 1, the strip 11 is looped downwardly and its parts extend through slots made in the top of a cover 12 fastened by means of screws 13 to the lower face of the bar. This cover 12 is of the ordinary screw-cap type to be removably seated upon a mating thread on the neck of a jar 10 containing a quantity of a liquid vermicide, such as kerosene oil. This oil rises within the porous strip 11 through the action of capillary attraction, so that the whole strip is soon wetted, while the porous wood of the bar 1 becomes thoroughly saturated, the supply being kept up by the strip 11 as long as some of the vermicide remains in the jar 10.

To prevent escape laterally of the strip 11, I prefer to fasten a reinforcing covering strip of wood 6 by screws 7 upon the face of the bar 1 through which the kerfs 8 and 9 open. This strip also becomes saturated by the vermicide. As most of the strip 11 is covered and inclosed in the substance of the bar 1, little evaporation or loss of oil occurs. Mites which infest hens avoid this saturated roost bar 1—6, and in case of leaving the fowls and coming in contact with the saturated bar, they are destroyed, so that the fowls are soon relieved from vermin. Mites cannot creep along the under surface of the bar 1—6 according to their usual way, as this surface is considerably interrupted by the exposed parts of the strip 11 so that no under part of the wood is unwetted.

Having described my invention, what I claim as new, and desire to secure by Letters Patent, is:

A roost bar having a longitudinal kerf opening at one side of the bar near its top and extending nearly to the opposite side, said bar having numerous transverse kerfs opening at the under face of the bar and opening upwardly into said longitudinal kerf, a porous wick-strip threaded through said communicating kerfs through the bar, and depending into a supply of vermicidal liquid, said bar being porous to be saturated by the liquid in the contacting wick-strip drawn thereinto by capillary attraction, and a covering plate mounted upon said bar to cover the lateral openings of said kerfs.

In testimony whereof I affix my signature.

JOSEPH KYLE.